US010762427B2

(12) United States Patent
Kaskari et al.

(10) Patent No.: US 10,762,427 B2
(45) Date of Patent: *Sep. 1, 2020

(54) CONNECTIONIST TEMPORAL CLASSIFICATION USING SEGMENTED LABELED SEQUENCE DATA

(71) Applicant: SYNAPTICS INCORPORATED, San Jose, CA (US)

(72) Inventors: Saeed Mosayyebpour Kaskari, Irvine, CA (US); Trausti Thormundsson, Irvine, CA (US); Francesco Nesta, Aliso Viejo, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/909,930

(22) Filed: Mar. 1, 2018

(65) Prior Publication Data

US 2018/0253648 A1   Sep. 6, 2018

Related U.S. Application Data

(60) Provisional application No. 62/465,738, filed on Mar. 1, 2017.

(51) Int. Cl.
*G10L 15/00* (2013.01)
*G06N 3/08* (2006.01)
(Continued)

(52) U.S. Cl.
CPC ............ *G06N 3/084* (2013.01); *G06K 9/627* (2013.01); *G06K 9/6256* (2013.01); *G06N 3/04* (2013.01);
(Continued)

(58) Field of Classification Search
CPC ...................................................... G10L 15/00
(Continued)

(56) References Cited

U.S. PATENT DOCUMENTS 5,155,763 A * 10/1992 Bigus ..................... G06N 3/105
                                                          379/111
5,630,023 A *  5/1997 Oteki ........................ G06F 7/68
                                                           706/41
(Continued)

OTHER PUBLICATIONS

Graves, Alex, et al., "Connectionist Temporal Classification: Labelling Unsegmented Sequence Data with Recurrent Neural Networks," Proceedings of the 23$^{rd}$ International Conference on Machine Learning, 2006, pp. 369-376, Pittsburgh, Pennsylvania.
(Continued)

*Primary Examiner* — Michael Colucci
(74) *Attorney, Agent, or Firm* — Haynes and Boone, LLP (57) ABSTRACT

Classification training systems and methods include a neural network for classification of input data, a training dataset providing segmented labeled training data, and a classification training module operable to train the neural network using the training data. A forward pass processing module is operable to generate neural network outputs for the training data using weights and bias for the neural network, and a backward pass processing module is operable to update the weights and biases in a backward pass, including obtaining Region of Target (ROT) information from the training data, generate a forward-backward masking based on the ROT information, the forward-backward masking placing at least one restriction on a neural network output path, compute modified forward and backward variables based on the neural network outputs and the forward-backward masking, and update the weights and biases.

20 Claims, 7 Drawing Sheets

Backward pass (51) Int. Cl.
    *G06K 9/62*     (2006.01)
    *G06N 3/04*     (2006.01)
    *G10L 15/06*     (2013.01)
    *G10L 15/16*     (2006.01)
    *G10L 15/02*     (2006.01)
    *G06N 7/00*     (2006.01)

(52) U.S. Cl.
    CPC .......... *G06N 3/0445* (2013.01); *G10L 15/063* (2013.01); *G10L 15/16* (2013.01); *G06N 7/005* (2013.01); *G10L 2015/025* (2013.01)

(58) Field of Classification Search
    USPC ............... 704/232, 219, 203, 201, 230, 500; 706/41, 26, 12; 714/748
    See application file for complete search history.

(56) References Cited

U.S. PATENT DOCUMENTS

| | | | | |
|---|---|---|---|---|
| 6,041,299 | A * | 3/2000 | Schuster | G10L 15/16 704/232 |
| 6,470,261 | B1 * | 10/2002 | Ng | G06N 3/086 701/117 |
| 6,615,382 | B1 * | 9/2003 | Kang | H04L 1/0009 714/748 |
| 6,728,404 | B1 * | 4/2004 | Ono | G06K 9/3241 382/118 |
| 7,110,526 | B1 * | 9/2006 | Dezonno | H04M 3/5232 379/265.02 |
| 8,675,839 | B1 * | 3/2014 | Noble, Jr. | H04M 3/5175 379/112.08 |
| 9,191,304 | B1 * | 11/2015 | Plate | H04L 12/6418 |
| 9,723,144 | B1 * | 8/2017 | Gao | H04M 3/5158 |
| 10,013,640 | B1 * | 7/2018 | Angelova | G06K 9/4628 |
| 10,114,554 | B1 * | 10/2018 | Gonzalez | G06F 3/061 |
| 2003/0115041 | A1 * | 6/2003 | Chen | G10L 19/02 704/200.1 |
| 2003/0225786 | A1 * | 12/2003 | Hall | G06N 5/025 |
| 2005/0216426 | A1 * | 9/2005 | Weston | G06K 9/6215 706/12 |
| 2005/0261898 | A1 * | 11/2005 | Van Klinken | H03H 21/0012 704/219 |
| 2010/0198054 | A1 * | 8/2010 | Ewing | A61B 5/055 600/420 |
| 2011/0224975 | A1 * | 9/2011 | Li | G10L 19/08 704/203 |
| 2015/0381809 | A1 * | 12/2015 | Fleming | H04M 3/5158 379/265.11 |
| 2016/0048766 | A1 * | 2/2016 | McMahon | G06N 5/047 706/12 |
| 2017/0005644 | A1 * | 1/2017 | Sayeh | G02F 1/00 |
| 2017/0083829 | A1 * | 3/2017 | Kang | G06N 3/0454 |
| 2017/0148431 | A1 * | 5/2017 | Catanzaro | G10L 15/14 |
| 2017/0249551 | A1 * | 8/2017 | Iljazi | G06F 3/0619 |
| 2017/0344829 | A1 * | 11/2017 | Lan | G06N 3/0445 |
| 2017/0372197 | A1 * | 12/2017 | Baughman | G06N 3/088 |
| 2018/0203848 | A1 * | 7/2018 | Perez | G10L 25/30 |
| 2018/0233130 | A1 * | 8/2018 | Kaskari | G10L 15/063 |
| 2018/0253648 | A1 * | 9/2018 | Kaskari | G06N 3/084 |

OTHER PUBLICATIONS

Graves, Alex, et al., "Towards End-to-End Speech Recognition with Recurrent Neural Networks," Proceedings of the 31$^{st}$ International Conference on Machine Learning, 2014, pp. 1764-1772, vol. 32, Beijing, China.

Graves, Alex, "Sequence Transduction with Recurrent Neural Networks," International Conference of Machine Learning 2012 Workshop on Representation Learning, Nov. 14, 2012, 10 Pages, arXiv:1211.3711.

Graves, Alex, et al., "Framewise Phoneme Classification with Bidirectional LSTM and Other Neural Network Architectures," Neural Networks, Jul.-Aug. 2005, vol. 18, Issues 5-6, pp. 602-610.

Hannun, Awni, et al., "Deep Speech: Scaling up end-to-end speech recognition," Dec. 19, 2014, 12 Pages, arXiv:1412.5567.

Hannun, Awni, et al., "First-Pass Large Vocabulary Continuous Speech Recognition using Bi-Directional Recurrent DNNs," Dec. 8, 2014, 7 Pages, arXiv:1408.2873.

Rabiner, L.R., "A Tutorial on Hidden Markov Models and Selected Applications in Speech Recognition," Proceedings of the IEEE, Feb. 1989, vol. 77, Issue 2, pp. 257-286.

Sak, Hasim, et al., "Learning Acoustic Frame Labeling for Speech Recognition with Recurrent Neural Networks," 2015 IEEE International Conference on Acoustics, Speech and Signal Processing (ICASSP), 2015, pp. 4280-4284.

* cited by examiner

FIG. 1
Forward Pass

FIG. 2
Backward pass

CONNECTIONIST TEMPORAL CLASSIFICATION USING SEGMENTED LABELED SEQUENCE DATA

CROSS-REFERENCE TO RELATED APPLICATIONS

This application claims the benefit of and priority to U.S. Provisional Patent Application No. 62/465,738 filed Mar. 1, 2017 and entitled "CONNECTIONIST TEMPORAL CLASSIFICATION (CTC) WITH NO LATENCY USING SEGMENTED LABELED SEQUENCE DATA" which is incorporated herein by reference in its entirety.

TECHNICAL FIELD

The present application relates generally to information classification, and more particularly, for example, to systems and methods for training a neural network using segmented labeled data for use in speech recognition systems.

BACKGROUND

Neural networks are commonly used in information classification systems, such as speech recognition systems for phoneme recognition. In one approach, an Artificial Neural Network (ANN) classifier is combined with a Hidden Markov Model (HMM) to transform network classifications into labeled sequences. The HMM is typically used to model the long range sequential structure of the data while the ANN is used to provide localized classifications. The use of an HMM model, however, requires unnecessary assumptions about the data. A Recurrent Neural Network (RNN) may also be combined with HMMs to label input sequences, but traditional approaches fail to exploit the full potential of RNN for modeling sequential data.

Further, many approaches are often highly complex and may not be practical for use in applications with memory, power and processing limitations, such as mobile telephones and other low power devices. Efforts to reduce complexity often come at the cost of less flexibility, memory inefficiencies, and other undesirable performance measures. In view of the foregoing, there is a need in the art for solutions to optimize information classification systems for training neural networks that are both fast and resource efficient.

SUMMARY

The present disclosure provides systems and methods that address a need in the art for improved classification. In various embodiments, a computer-implemented method for training a neural network for phoneme recognition comprises receiving, at a computing device, a stream of segmented, labeled training data having a sequence of frames, generating neural network outputs for the sequence of frames in a forward pass through the training data and in accordance with weights and biases and updating the weights and biases through a backward pass through the training data.

In various embodiments, the backward pass comprises obtaining Region of Target (ROT) information from the stream of segmented, labeled training data, generating a forward-backward masking based on the ROT information, the forward-backward masking placing at least one restriction on a neural network output path, computing modified forward and backward variables based on the neural network outputs and the forward-backward masking, and updating the weights and biases of the neural network. The weights and biases may be updated by one or more of identifying target and shared regions in the stream of segmented, labeled training data, computing a soft target using the forward-backward masking and the neural network outputs (e.g., computing the soft target only for identified target and shared regions), and computing a signal error based on the neural network outputs and the soft target.

The weights and biases of the neural network may further be updated by adaptively learning to improve a convergence rate of the neural network, which may include implementing a first algorithm based on momentum for the weights and biases of an output layer of the neural network and implementing a second algorithm based on a Root Mean Square (RMS) of a signal error for other weights and biases.

In various embodiments, a classification training system comprises a neural network for use in a classification of input data, a training dataset providing segmented labeled training data, and a classification training module operable to train the neural network using the segmented labeled training data. The classification training module may comprise a forward pass processing module operable to train the neural network by generating neural network outputs for the training data using weights and bias for the neural network, and a backward pass processing module operable to train the neural network by updating the weights and biases in a backward pass.

In one or more embodiments, the backward pass module is operable to obtain Region of Target (ROT) information from the segmented, labeled training data, generate a forward-backward masking based on the ROT information, the forward-backward masking placing at least one restriction on a neural network output path, compute modified forward and backward variables based on the neural network outputs and the forward-backward masking, and update the weights and biases of the neural network. The weights and biases may be computed through one or more of computing a soft target using the forward-backward masking and the neural network outputs, computing a signal error based on the neural network outputs and the soft target, identifying target and shared regions in the segmented, labeled training data and computing the soft target only for identified target and shared regions.

In various embodiments, the classification training system is further operable to update the weights and biases of the neural network by adaptively learning to improve a convergence rate of the neural network, which may include a first algorithm based on momentum for the weights and biases of an output layer of the neural network, and a second algorithm based on a Root Mean Square (RMS) of a signal error for other weights and biases.

In various embodiments, the classification training system may comprise a phoneme recognition system, which operates in accordance with the present disclosure without latency.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. The included drawings are for illustrative purposes and serve only to provide examples of possible systems and methods for the disclosed methods and systems. These drawings in no way limit any changes in form and detail that may be made to that which is disclosed by one skilled in the art without departing from the spirit and scope of this disclosure.

DETAILED DESCRIPTION

In accordance with various embodiments of the present disclosure, systems and methods for training a recurrent neural network are disclosed. In one embodiment, a novel Connectionist Temporal Classification (CTC) network is proposed that uses pre-segmented labeled training data. The systems and methods disclosed herein are more effective and computationally efficient than conventional CTC networks, the trained system can operate without latency, and the training methods produce improved (i.e., fast) convergence for CTC networks.

Conventional Recurrent Neural Networks (RNNs) can use internal memory to process arbitrary sequences of inputs. This makes RNNs suitable for tasks such as speech recognition since RNNs are able to model both the acoustic and temporal pattern of the input sequences. One approach for temporal classification with RNNs uses a Connectionist Temporal Classification (CTC) network, such as described in Graves, A., Fernandez, S., Gomez, F., Schmidhuber, J., "Connectionist temporal classification: labelling unsegmented sequence data with recurrent neural nets," Proceedings of the 23rd International Conference on Machine Learning, Pittsburgh-Pennsylvania (U.S.A.) (2006) (hereinafter, "Graves, et al."), which is incorporated herein by reference in its entirety. One idea behind CTC is that instead of generating a label as output from the neural network, a probability distribution is generated at every time step. This probability distribution may then be decoded into a maximum likelihood label. The network is then trained by creating an objective function that coerces the maximum likelihood decoding for a given sequence to correspond to a desired label.

Unlike the approach described above using RNN combined with HMM, CTC network models all aspects of the sequence with a single RNN, and does not require the addition of an HMM to model the temporal pattern of the input sequence. The RNN may be trained directly for temporal classification tasks, which can be achieved by allowing the network to make label predictions at any point in the input sequence provided the overall sequence of labels is correct. Because CTC directly estimates the probabilities of the complete label sequences, external post-processing is not required to use the network as a temporal classifier.

Conventional systems, such as the system described in Graves et al., may include frame-wise and CTC networks classifying a speech signal. The system tracks probabilities of observing phonemes at particular times. The CTC network predicts the sequence of phonemes (typically as a series of spikes, separated by 'blanks', or null predictions), while the frame-wise network attempts to align the sequence of phonemes with temporal segmentation. The frame-wise network may receive an error or may misalign the segment boundaries, even if it predicts the correct phoneme. When one phoneme always occurs beside another, CTC tends to predict them together in a double spike. The choice of labeling can be read directly from the CTC outputs (follow the spikes), whereas the predictions of the frame-wise network must be post-processed before use.

Conventional CTC techniques for use in end-to-end Automatic Speech Recognition (ASR) face some obstacles such as the challenge of incorporating the lexicons and language models into decoding. It has been shown that combining the CTC network with another classifier can improve the performance of the ASR. For example, RNNs for Large Vocabulary Conversational Speech Recognition (LVCSR) trained with CTC can be improved with the level minimum Bayes risk (sMBR) sequence training criterion and approaches the state-of-the-art performance. Despite the promising results obtained using the CTC technique, conventional approaches have several limitations including high computational complexity, unknown latency, and high amount of memory usage which is required to perform the forward-backward algorithm especially when the sequence of training is long.

Another approach is described in A. Graves, "Sequence transduction with recurrent neural networks," in ICML Representation Learning Workshop, 2012, which is incorporated herein by reference in its entirety. As disclosed, the RNN Transducer approach is an extension of the CTC algorithm. Unlike the CTC, which can be seen as an acoustic-only model, the RNN Transducer has another RNN that acts as a language model Similar to the CTC, the probability of observing an output sequence for a given input is computed using the forward-backward algorithm and has similar limitations as other conventional approaches.

Conventional systems, such as the systems described herein, have several limitations and disadvantages for practical usage, which are overcome by the systems and methods disclosed herein. First, the CTC network of Graves does not use pre-segmented labeled training data. The embodiments described herein make use of all the information available from the training data to improve the performance of training. Thus, the present disclosure is suitable for speech recognition applications since pre-segmented labeled training data, such as the TIMIT dataset, is widely available. The embodiments disclosed here include solutions which utilize the information of pre-segmented labeled training data to improve the performance. While some conventional algorithms that use labeled training data may be sensitive to alignment errors, the embodiments disclosed herein are not sensitive to the exact alignment of the labels of the input data sequence. As a result, the present disclosure provides a good solution to take the advantage of segmented data even where the labeling alignments are not exactly correct.

The computational complexity of the CTC network is high due to the high number of multiplications by taking into consideration all possible paths to compute the signal error. However, the amount of complexity is greatly reduced using the embodiments disclosed herein which include restrictions on the paths that are acceptable according to a region which is called Region of Target (ROT). As a result, a simplified and computationally efficient method is disclosed herein to compute the signal error.

In many conventional approaches, the memory requirements and the computational complexity of the CTC method is directly related to the input sequence length. This is because for each input sequence the forward pass will be performed to obtain the network's outputs for the entire sequence based on the network's outputs. Forward and backward variables of the same length as the input sequence are typically computed. In contrast to conventional approaches, various embodiments disclosed herein use forward and backwards variables that contain mostly zeroes. This can reduce the computational complexity and it possible to implement a memory efficient trainer using the proposed CTC algorithm.

For tasks where segmentation is required (e.g. protein secondary structure prediction), it would be problematic to use a conventional CTC network such as described herein since there is no guarantee that the network prediction would be aligned with the corresponding part of the sequence. On the other hand, the method disclosed herein can solve this problem since it would preserve the alignment of the network prediction.

Finally, there is no control on the latency of the conventional CTC algorithms discussed above, which may result in a trained system having unreasonably high latency. In contrast, the methods disclosed herein define a Region of Target (ROT) which includes the whole duration of the phoneme plus the boundary transitions.

Figure 1:
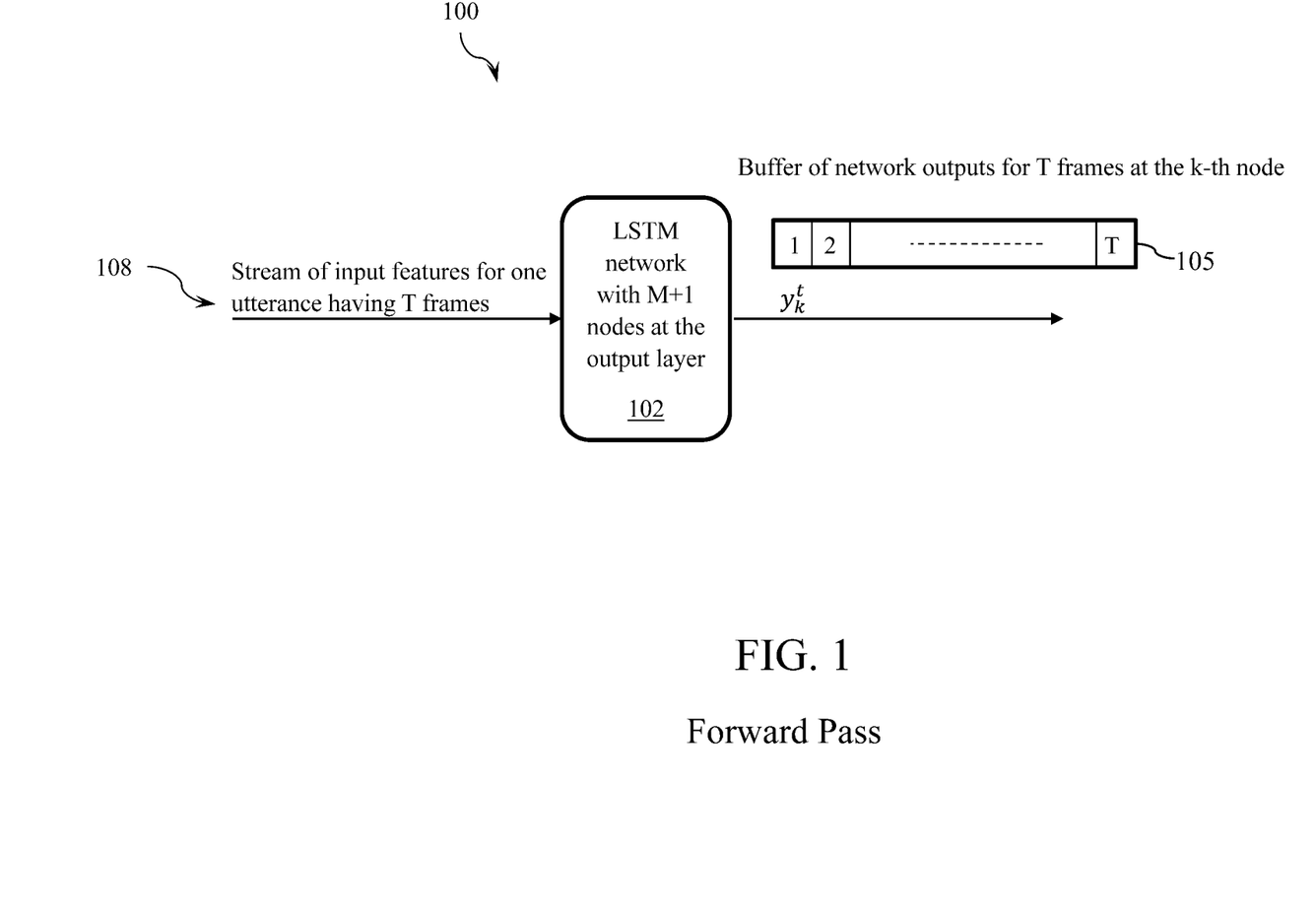
FIG. 1 illustrates an exemplary classification system for performing a forward pass on training data to train an artificial neural network, in accordance with an embodiment.
Figure 2:
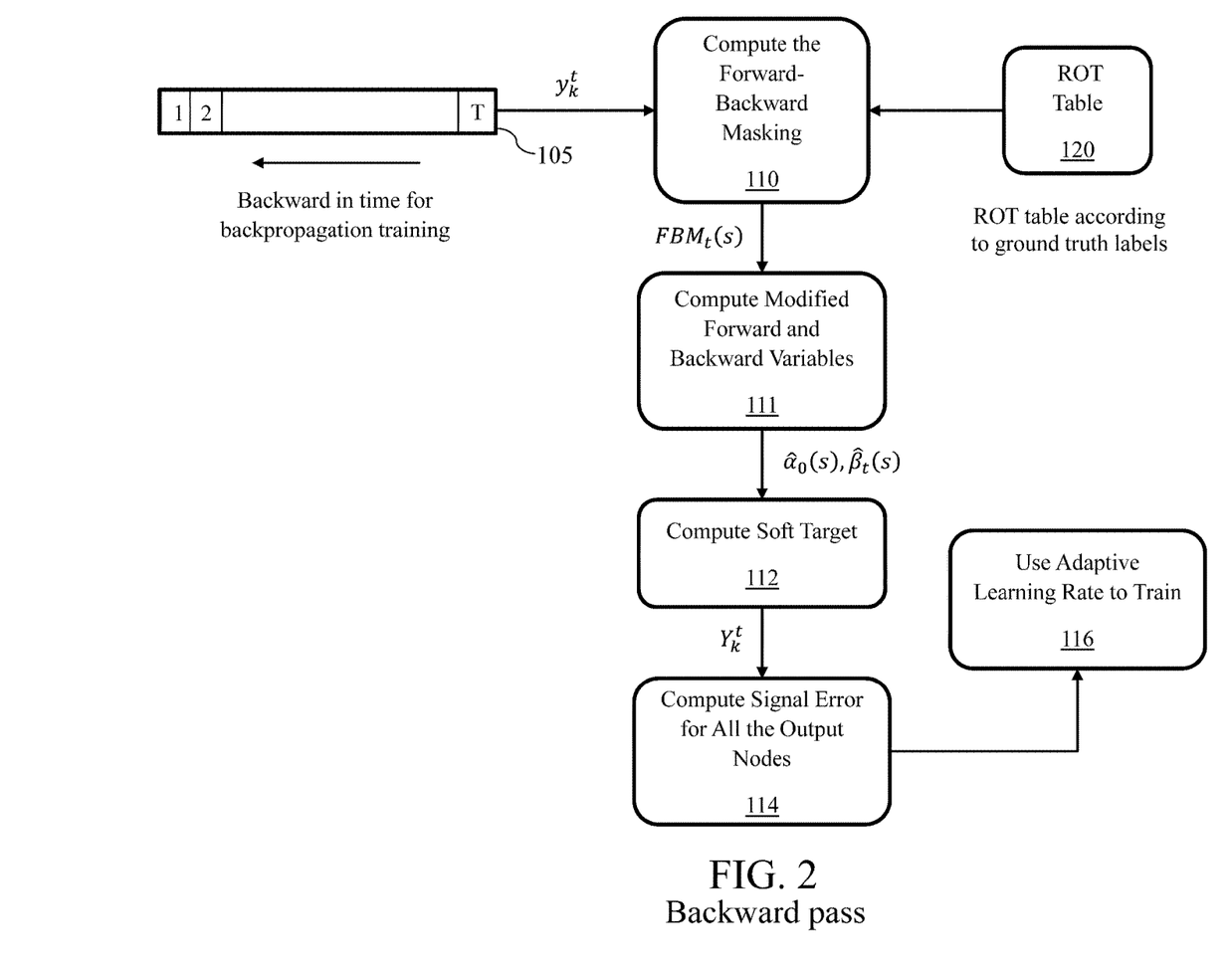
FIG. 2 illustrates an exemplary classification system for performing a backward pass on training data to train an artificial neural network, in accordance with an embodiment.

Referring to FIGS. 1 and 2, an embodiment of a system to train a network for a classification application, such as phoneme recognition, will now be described. In a Forward Pass 100 (FIG. 1), the network outputs for all of the output nodes ($y_k^t$) at the t-th frame of a sequence of training data 108 (comprising a stream of input features computed for a sequence of frames) are computed, where M is the number of classes of phonemes and the network 102 has M+1 nodes at the output layer. The network outputs for all the frames of the sequence are stored in a buffer 105.

In the Backward Pass (FIG. 2), the system starts from the last frame and goes backward in time to compute the signal error for each frame at the input of the softmax node. This error is propagated backwards through the unfolded network, for example, by using the standard Back Propagation Through Time (BPTT) equations as disclosed in A. Graves and J. Schmidhuber, "Framewise phoneme classification with bidirectional long short-term memory (LSTM) and other neural network architectures", Neural Networks, vol. 18, pp. 602-610, 2005, which is incorporated herein by reference in its entirety.

In various embodiments, the backward pass includes the following steps. In step 110, at each frame, the Region Of Target (ROT) and the forward-backward masking is determined, using information retrieved from the ROT table 120. The beginning and the end of this region is used to compute the signal error. Using ROT information the forward-backward marking is computed. In step 111, the modified forward and backward variables are computed. The soft target is computed in step 112 using the modified forward and backward variables and the network outputs. In step 114, the signal error is computed based on the network outputs and the estimated soft target. Finally, an adaptive learning rate algorithm is used to update the weights and biases of the network in step 116.

The CTC network proposed in Graves, et al., has a softmax output layer with one more output node than there are labels. If the number of labels is M, then the activations of the first M output nodes are interpreted as the probabilities of observing the corresponding labels at particular times. The activation of the extra node is the probability of observing a 'blank', or no label. The network outputs define the probabilities of all possible ways of aligning all possible label sequences with the input sequence. The total probability of any one label sequence can then be found by summing the probabilities of its different alignments. The goal of CTC algorithm in Graves, et al., is to maximize the probabilities of the correct labeling.

Figure 3:
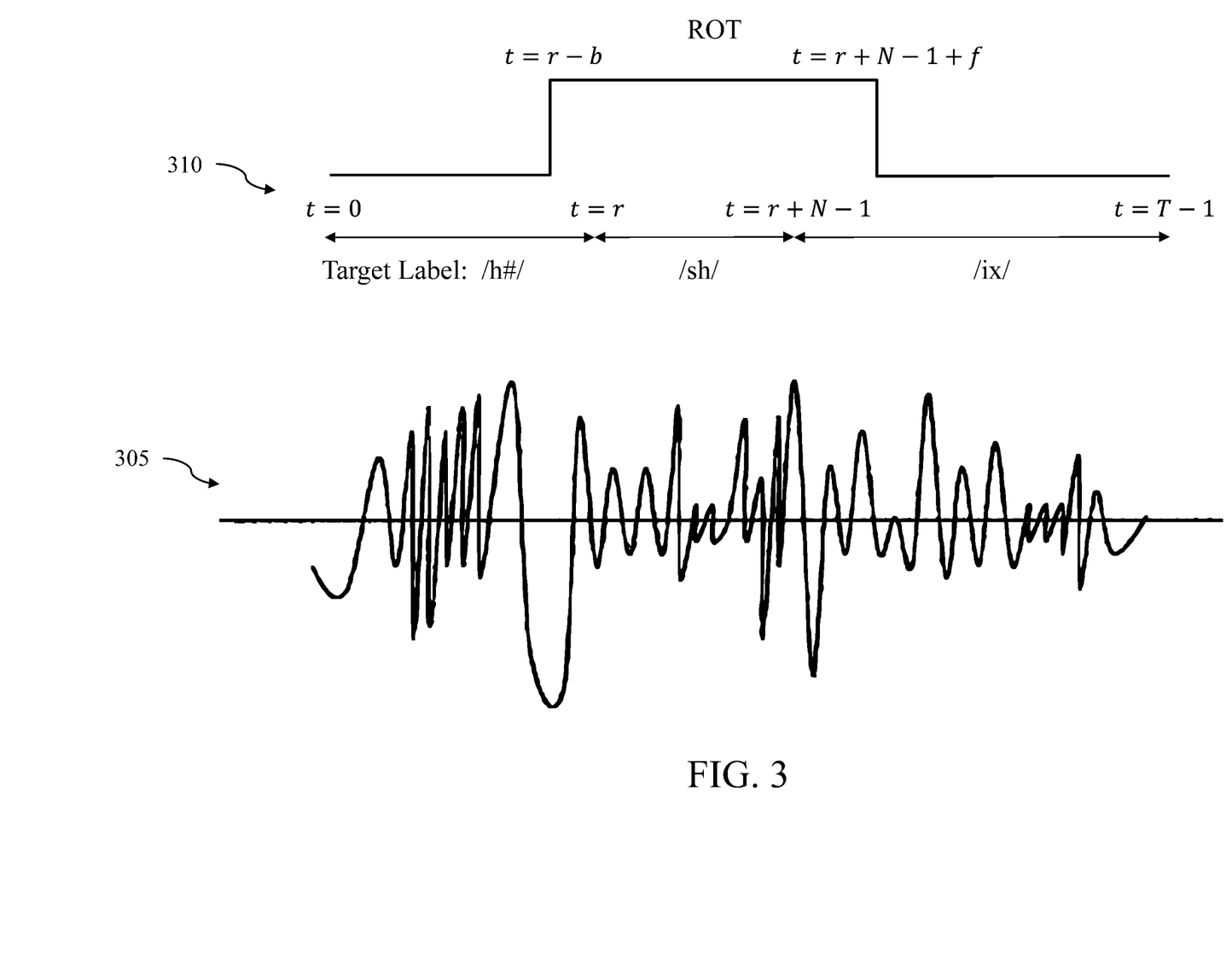
FIG. 3 illustrates exemplary Region of Target (ROT) labeling with an exemplary sequence of input data, in accordance with an embodiment.

An exemplary operation of an embodiment of a CTC network in accordance with the present invention is illustrated in FIG. 3. FIG. 3 illustrates an example of ROT labeling. As illustrated, an example input in the form of an audio waveform 305 is provided and divided into a sequence of audio frames 310 (e.g., T number of frames in order). In this example, an input sequence including three labels is shown, namely, "h #" (start from t=0 to t=r), "sh" start from t=r to t=r+N−1) and "ix" start from t=r+N−1 to t=L−1). The correct labeling for this example is LABEL="h #", "sh", "ix" and there are many ways that the network can generate this correct labeling through its output. For example, if it is assumed that the total number of frames is T=8, then all of the following outputs are considered to be the correct labeling output ("bl" is blank):

"h #", "sh", "ix", "ix", "ix", "bl", "bl", "bl"→LABEL="h #", "sh", "ix"

"h #", "h #", "bl", "bl", "sh", "ix", "ix", "ix"→LABEL="h #", "sh", "ix"

"bl", "bl", "bl", "h #", "sh", "ix", "bl", "bl"→LABEL "h #", "sh", "ix"

In this embodiment, the labeling is obtained by removing all blanks and repeated labels from the outputs of the network. Each of the above three examples is considered to be a possible output path of network. As it is clear, all of these three different output paths have the exact same output labels. The following two examples do not produce correct labeling.

"h #", "sh", "ix", "bl", "ix", "ix", "bl", "bl"→LABEL "h #", "sh", "ix", "ix"

"h #", "bl", "h #", "bl", "bl", "sh", "ix", "ix"→LABEL="h #", "h #", "sh", "ix"

In the CTC network of Graves, et al., no restriction on the timing of the network outputs is considered since it is assumed that the data is not segmented. However, training the network with no timing restriction may lead to unreasonable latency. To solve this problem, various embodiments of the present invention apply restrictions to the correct timing for the network outputs. In one embodiment, segmented data such as a TIMIT dataset is available for training. An ROT for each label is defined where the network is expected to spike for that label. As shown in FIG. 3, the ROT for label "sh" covers all the frames of "sh" including the transitions on the right and on the left. By defining the ROT to cover the frame and expected transitions, the network is allowed to spike for this label during this region.

Next, an embodiment of a CTC algorithm using this ROT restriction is discussed.

Compute the Forward-Backward Masking (Step 110, FIG. 2)

Figure 4:
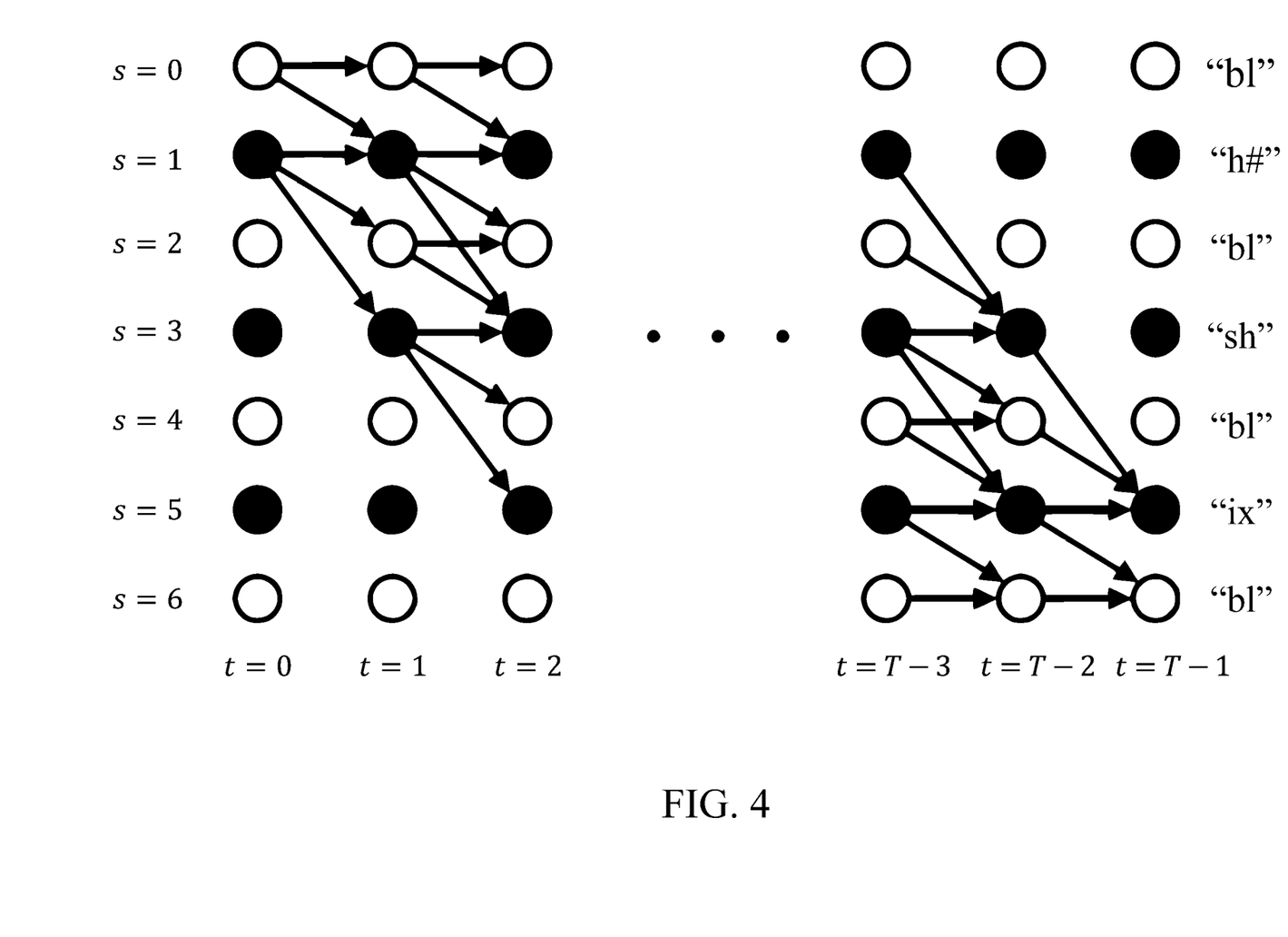
FIG. 4 illustrates an exemplary forward-backward algorithm applied to a labeled sequence of training data, in accordance with an embodiment.

As discussed above, a goal of convention CTC network, such as the network described in Graves, et al., is to maximize the probability of having the correct output labeling by considering all the possible output paths. To allow blanks in the output paths, for each output label such as L="h #", "sh", "ix" we consider a modified label sequence L'="bl", "h #", "bl", "sh", "bl", "ix", "bl", with blanks added to the beginning and the end and inserted between every pair of labels as it is shown in FIG. 4. FIG. 4 illustrates a forward backward algorithm applied to a labeled sequence of training data in accordance with an embodiment. As illustrated, black circles represent labels, white circles represent blanks, and arrows signify allowed transitions. Forward variables are updated in the direction of the arrows, and backward variables are updated against them. The length of L' is therefore 2|L|+1. Also, it is assumed that the length of the sequence for training (the number of frames) is T.

All possible output paths are shown by the arrows. In the present embodiment, a goal is to put restrictions on the output paths according to the ROT which is defined in FIG. 3. To this end, a forward-backward masking (FBM$_t$(s), t=0, ..., T−1, s=0, ..., 2|L|) is defined and applied directly to the forward and backward variables. To obtain FBM$_t$(s), the segmented data information including the timing of the labels is used for each training sequence. This information is stored as the timing information for all the labels, e.g., $X_{time}^{label}$={0, r, r+N−1, T−1}, as shown in FIG. 3. In this embodiment, $X_{time}^{label}$ stores the transition time information for the labels. For example, $X_{time}^{label}$(1)=r is the duration of the first phoneme "h #" in FIG. 3. A proposed algorithm to obtain the FBM$_t$(s) using $X_{time}^{label}$ information is given below:

$$FBM_t(0) = \begin{cases} 1 & t \leq X_{time}^{label}(1) + f - 2 \\ 0 & \text{otherwise} \end{cases} \quad (1)$$

for $s_{odd}$ = 1 to 2|L| −1 → $s_{odd}$ =odd number $$t_{start}^{odd} = \max\left(FBM_t\left(\frac{s_{odd}}{2}\right) - b, 0\right)$$

$$t_{end}^{odd} = \min\left(FBM_t\left(\frac{s_{odd}}{2} + 1\right) + f - 1, T - 1\right)$$

$$FBM_t(s_{odd}) = \begin{cases} 1 & t_{start}^{odd} \leq t \leq t_{end}^{odd} \\ 0 & \text{otherwise} \end{cases}$$

$s_{even} = s_{odd} + 1$
$t_{start}^{even} = t_{start}^{odd} + 1$ $$t_{end}^{even} = \min\left(FBM_t\left(\frac{s_{odd}+2}{2} + 1\right) + f - 2, T - 1\right)$$

$$FBM_t(s_{even}) = \begin{cases} 1 & t_{start}^{even} \leq t \leq t_{end}^{even} \\ 0 & \text{otherwise} \end{cases}$$

end where f depends on the latency of the system and it is set to zero for no-latency system, and b depends on the number of frames backward in the ROT that the network should see to spike for a phoneme. It is desirable that this value not be zero.

5.2 Compute the Modified Forward and Backward Variables (Step 111, FIG. 2)

As it is mentioned above in the discussion of step 110, the modified label sequence L' has blanks added to the beginning and the end and inserted between every pair of labels and so it has length equals to 2|L|+1 where |L| is the length of the training label sequence L. The output of the network at the frame t for each symbol of the training label sequence is denoted by $y_{L_s}^t$. A blank symbol is denoted by $y_{bl}^t$.

After computing the forward-backward masking FBM$_t$(s), the modified forward variable ($\hat{\alpha}_t$(s)) and the modified backward variable ($\hat{\beta}_t$(s)) are computed as follows:

1) Forward Variable Calculation in Logarithm Domain

Initialization Formula $$\hat{\alpha}_0(0) = \log(y_{bl}^0)$$

$$\hat{\alpha}_0(1) = \log(y_{L_0}^0)$$

$$\hat{\alpha}_0(s) = \infty \to \text{for } s > 1$$

Recursion Formula $$\hat{\alpha}_t(s) = \begin{cases} A + \log(y_{L_s}^t) & \text{if } \mod(s,2) == 0 \text{ and } FBM_t(s) \neq 0 \\ B + \log(y_{L_s}^t) & \text{if } \mod(s,2) \neq 0 \text{ and } FBM_t(s) \neq 0 \\ \infty & \text{otherwise} \end{cases} \quad (2)$$

$A = \log(\exp(\hat{\alpha}_{t-1}(s)) + \exp(\hat{\alpha}_{t-1}(s-1)))$ $B = \log(\exp(\hat{\alpha}_{t-1}(s)) + \exp(\hat{\alpha}_{t-1}(s-1)) + \exp(\hat{\alpha}_{t-1}(s-2)))$ 2) Backward Variable Calculation in Logarithm Domain Initialization Formula $$\hat{\beta}_{T-1}(|L'|-1) = \log(y_{bl}^{T-1})$$

$$\hat{\beta}_{T-1}(|L'|-2) = \log(y_{L_0}^{T-1})$$

$$\hat{\beta}_{T-1}(s) = \infty \to \text{for } s < |L'|-2$$

Recursion Formula $$\hat{\beta}_t(s) = \begin{cases} A + \log(y_{L_s}^t) & \text{if } \mod(s,2) == 0 \text{ and } FBM_t(s) \neq 0 \\ B + \log(y_{L_s}^t) & \text{if } \mod(s,2) \neq 0 \text{ and } FBM_t(s) \neq 0 \\ \infty & \text{otherwise} \end{cases} \quad (3)$$

$A = \log(\exp(\hat{\beta}_{t+1}(s)) + \exp(\hat{\beta}_{t+1}(s+1)))$ $B = \log(\exp(\hat{\beta}_{t+1}(s)) + \exp(\hat{\beta}_{t+1}(s+1)) + \exp(\hat{\beta}_{t+1}(s+2)))$ where $\hat{\alpha}_t$(s) and $\hat{\beta}_t$(s) are the modified of forward and backward variables, respectively.

Compute the Soft Target (Step 112, FIG. 2)

The product of the forward and backward variables at a given s and t is the probability of all the paths corresponding to the labeling |L| that go through the symbol s at time t. In logarithm domain, the product is replaced by addition and so the probability of all the paths for |L| is related to the sum of the modified forward and backward variables. As a result, the soft target for each symbol or phoneme k among all the M+1 classes can be computed as follows:

$$Y'_k = \frac{\sum_{s \in lab(L,k)} \exp(\hat{\alpha}_i(s) + \hat{\beta}_t(s) - \log(y'_{L'_s}))}{\sum_{s=0}^{2|L'|} \exp(\hat{\alpha}_i(s) + \hat{\beta}_t(s) - \log(y'_{L'_s}))} \quad (4)$$

$$lab(L, k) = \{s : L'_s = k\}$$

Compute Signal Error for all the Output Nodes (Step 114, FIG. 2)

In this section, an embodiment is disclosed for efficient computation of the signal error at each of the M+1 nodes of the network output prior to applying the softmax nonlinear function. It is assumed that the network output for label k (among M+1 symbols) at frame t before and after softmax nonlinear function are denoted by $z_k^t$, and $y_k^t$, respectively. The relationship between $z_k^t$ and $y_k^t$ are given below:

$$y_k^t = \frac{e^{z_k^t}}{\sum_{all\ k} e^{z_k^t}} \quad (5)$$

The computation of the signal error or the objective function derivatives with respect to the unnormalized outputs will now be described with reference to the example in FIG. 3. Assume that the signal error at frame t where r≤t≤r+N−1 for symbol k is denoted by $\delta_k^t$. As shown in FIG. 3, symbol k="sh" is the target label at frame t (r≤t≤r+N−1). If it is assumed that f, b≠0, then the phoneme duration for label k="sh" (r≤t≤r+N−1) can be divided to three non-overlapping regions:

1) r≤t≤r+f−1→region R1 ("shared region")
2) r+f−1<t≤r+N−b−1→region R2 ("exclusive region")
3) r+N−b−1<t≤r+N−1→region R3 ("shared region")

As shown, R1 is a shared region between phonemes "h #" and "sh" and R3 is a shared region between phonemes "sh" and "ix". The "h #" or "ix" phonemes are called "shared phoneme" for "sh" and R1 or R3 are called a "shared region". However, R2 is an exclusive region for phoneme "sh" and so there is no "shared phoneme" in this region and R3 is called an "exclusive region". Now the signal error at frame t depending it is in the "exclusive region" or not can be computed as follows:

a) if frame t is in "shared region":

$\delta_{k_{target}}^t = Y_{k_{target}}^t - y_{k_{target}}^t$ $\delta_{k_{target}}^t = Y_{k_{target}}^t - y_{k_{target}}^t$ $\delta_{bl}^t = (1 - Y_{k_{target}}^t - Y_{k_{target}}^t) - y_{bl}^t$ for all other labels → $\delta_k^t = -y_k^t$ b) if frame t is in "exclusive region":

$\delta_{k_{target}}^t = Y_{k_{target}}^t - y_{k_{target}}^t$ $\delta_{bl}^t = 1 - Y_{k_{target}}^t - y_{bl}^t$ for all other labels → $\delta_k^t = y_k^t$ where $k_{target}^t$ label (here $k_{target}$="sh") and $k_{shared}^t$ is the "shared phoneme" (here it can be $k_{shared}^t$="# h" or $k_{shared}^t$="ix").

Proposed Adaptive Learning Rate (Step 116, FIG. 2)

Training the network of the present embodiment may converge too slowly for many applications. In order to improve the performance and increase the training convergence rate, an adaptive learning rate algorithm is utilized. In one embodiment, two different methods are used to update the weights and biases of the network. The weights and biases connected to the output layer are updated according to the following rule for t-th epoch:

$$X_{weight}(t) = m \times \Delta_{weight}(t-1) + \mu \times \delta_{weight}(t) \quad (12)$$

$$\Delta_{weight}(t) = \begin{cases} X_{weight}(t) & \text{if } \theta_{low}^{weight} \le X_{weight}(t) \le \theta_{up}^{weight} \\ \Delta_{weight}(t-1) & \text{otherwise} \end{cases}$$

$$\text{update} = \begin{cases} X_{weight}(t) & \text{if } \theta_{low}^{weight} \le X_{weight}(t) \le \theta_{up}^{weight} \\ 0 & \text{otherwise} \end{cases}$$

$$\text{weight}(t) = \text{weight}(t-1) + \text{update}$$

where m=0.9 is the momentum and μ=1e−3 is the learning rate. $\theta_{low}^{weight}$ and $\theta_{up}^{weight}$ are the lower bound and upper bound for the update of the weights (or the biases). $\delta_{weight}(t)$ is the error signal which is received at the corresponding weights (or biases) using the standard BPTT. For example, for bias of the blank node of the output layer, $\delta_{weight}(t)$ equals to $\delta_n^{(1)}$ for n-th frame. As shown in (12), the weights (or the biases) at each epoch are updated using update value. For other weights and biases of the LSTM network, the following rule may be used to update them in accordance with one embodiment:

$$\text{initilization for the first epoch} \to E(0) = 0 \quad (13)$$

$$E(t) = \rho \times E(t-1) + (1-\rho) \times (\delta_{weight}(t))^2$$

$$\text{RMS} = \sqrt{E(t) + \varepsilon}$$

$$X_{weight}(t) = \frac{\mu}{\text{RMS}} \delta_{weight}(t)$$

$$\text{update} = \begin{cases} X_{weight}(t) & \text{if } \theta_{low}^{weight} \le X_{weight}(t) \le \theta_{up}^{weight} \\ 0 & \text{otherwise} \end{cases}$$

$$\text{weight}(t) = \text{weight}(t-1) + \text{update}$$

where ρ=0.95 is a smoothing factor and ε=1e−6 is a fixed constant to avoid infinity. The other parameters are similar to what is discussed above.

Figure 5:
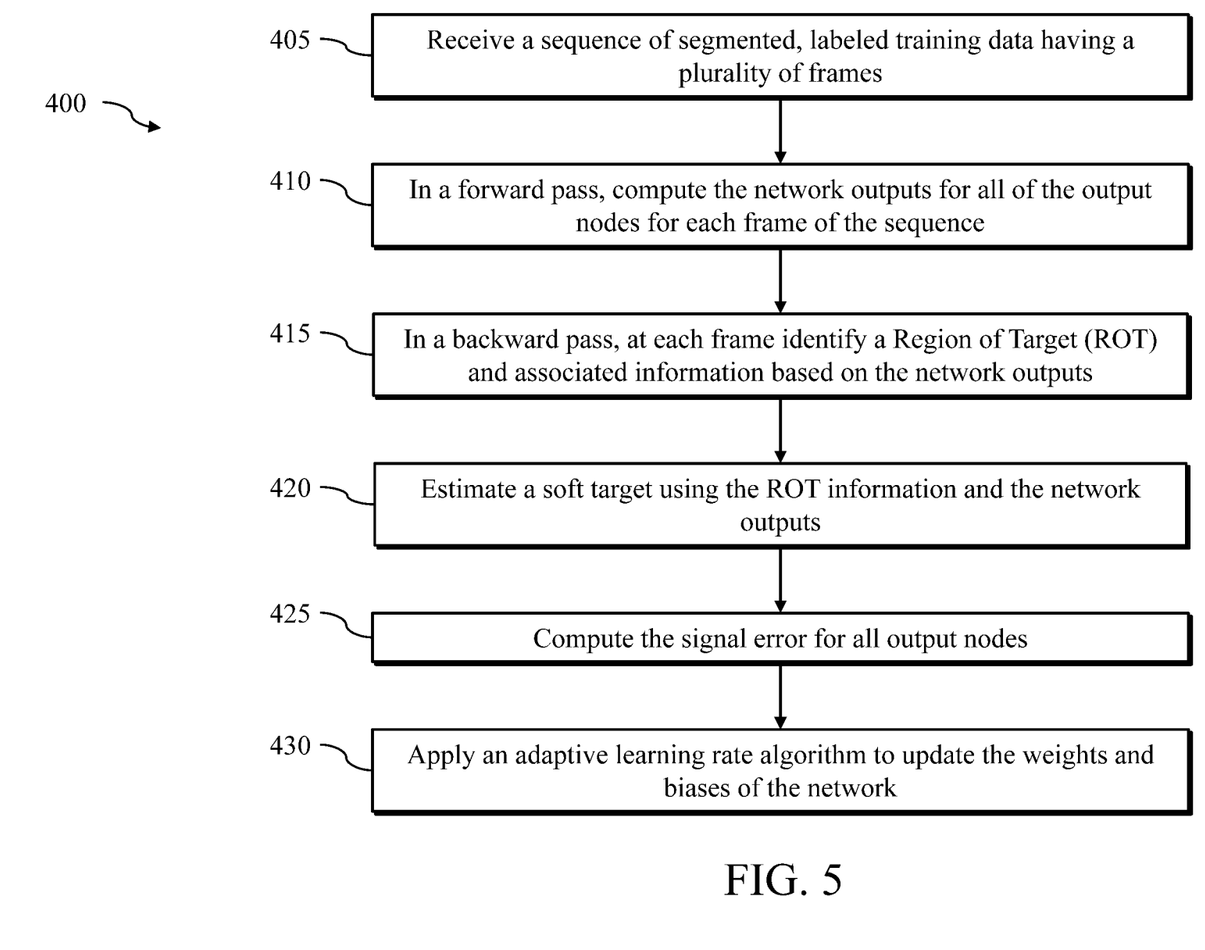
FIG. 5 is a flow chart illustrating an exemplary operation of a classification training system, in accordance with an embodiment.

FIG. 5 is a flow chart illustrating an embodiment of a high level training process 400 as discussed above. In step 405, the system receives a sequence of segmented, labeled training data having a plurality of frames. Next, in step 410, a forward pass process is conducted through the training data to compute the network outputs for all of the output nodes for each frame of the training sequence. A backward pass process is then initiated in step 415 at each frame, identifying a ROT and associated information based on the network outputs. In step 420, soft targets are estimated using the ROT information and the network outputs. The signal error for all output nodes is calculated in step 425. Finally, in step 430, an adaptive learning rate algorithm is applied to update the weights and biases of the network.

Figure 6:
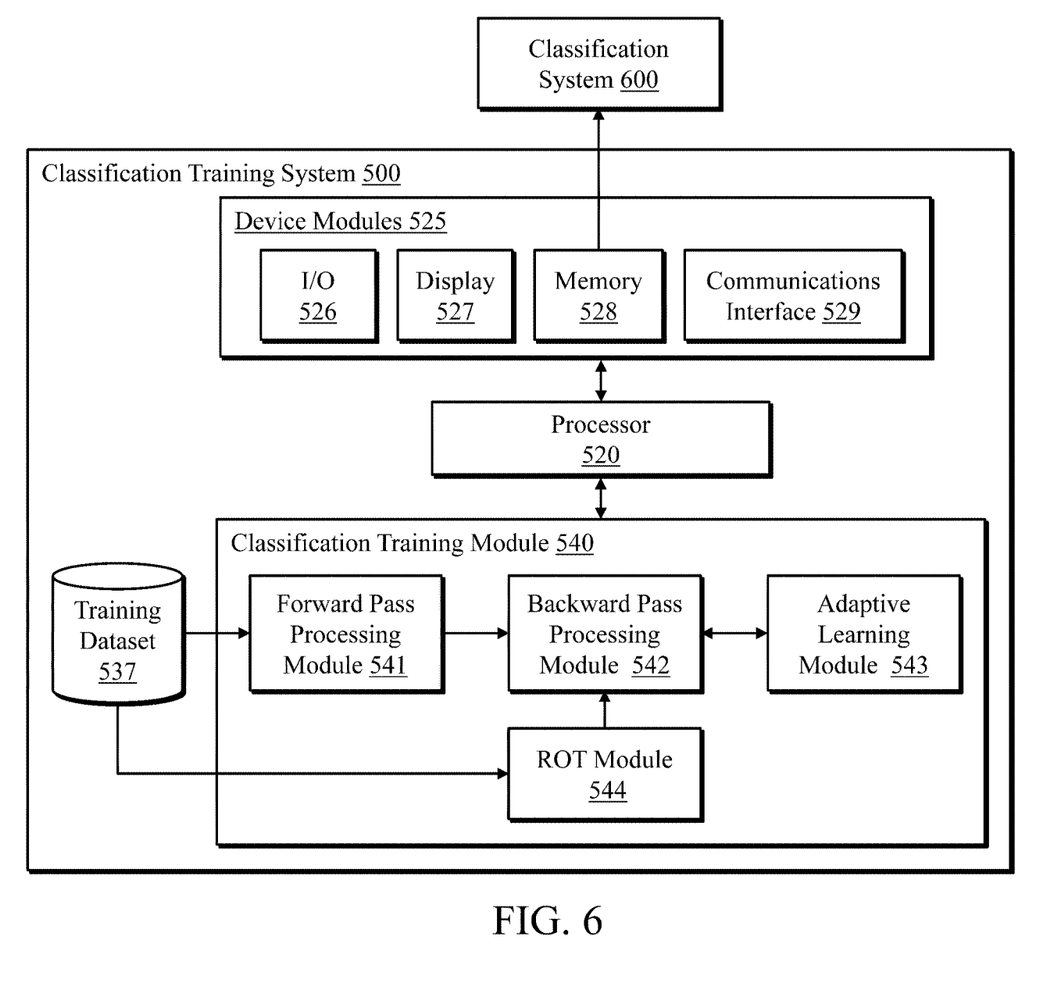
FIG. 6 is a block diagram illustrated a classification training system, in accordance with an embodiment.

FIG. 6 illustrates an exemplary classification training system 500 of some embodiments that performs at least part of the classification training process described above. The classification training system 500 is programmed to perform the training processes described above. The classification training system includes the training dataset 537 which contain the pre-segmented labeled training data. Training dataset 537 is connected to the classification training module 540 which includes the ROT module 544. The ROT module builds an ROT table using information about the segmented training data provided by training dataset 537. The classification training module 540 also includes a forward pass processing module 541 programmed to perform the forward pass process described above and a backward pass processing module 542 programmed to perform the backward pass processes described above. The adaptive learning module 543 includes one or more adaptive learning algorithms that can be used by the backward pass processing module to update the weights and biases of a neural network, such as the LSTM network, as described above. In some of these embodiments, the classification training module 540 can iteratively perform the training processes using different training data to continuously improve and update the neural network. The classification training module 540 can store the updated neural network in the memory 528. The processor 520, can be a micro-controller, a digital signal processor (DSP), or other processing components, for controlling and facilitating the operations of the classification training system 500, including controlling communications with internal and external devices. The classification training system 500 further includes one or more communication channels such as a bus for facilitating communication of data between various components of the classification system 500. Components may include device modules 525 for providing device operation and functionality, which may include input/output components 526 such as a touch screen, keyboard, mouse, etc., a display 527 such as a monitor, a memory 528 such as RAM, solid state drive, disk drive, database, etc., and a communications interface 529. In some embodiments, the communications interface 529 may include a network interface (e.g., Ethernet interface) or a wireless transceiver for enabling the classification system to communicate with remote devices over a network. In operation, training of the neural network is performed by classification training system 500 offline and the trained model including the weights and biases of the neural network will be stored in Classification system 600.

Figure 7:
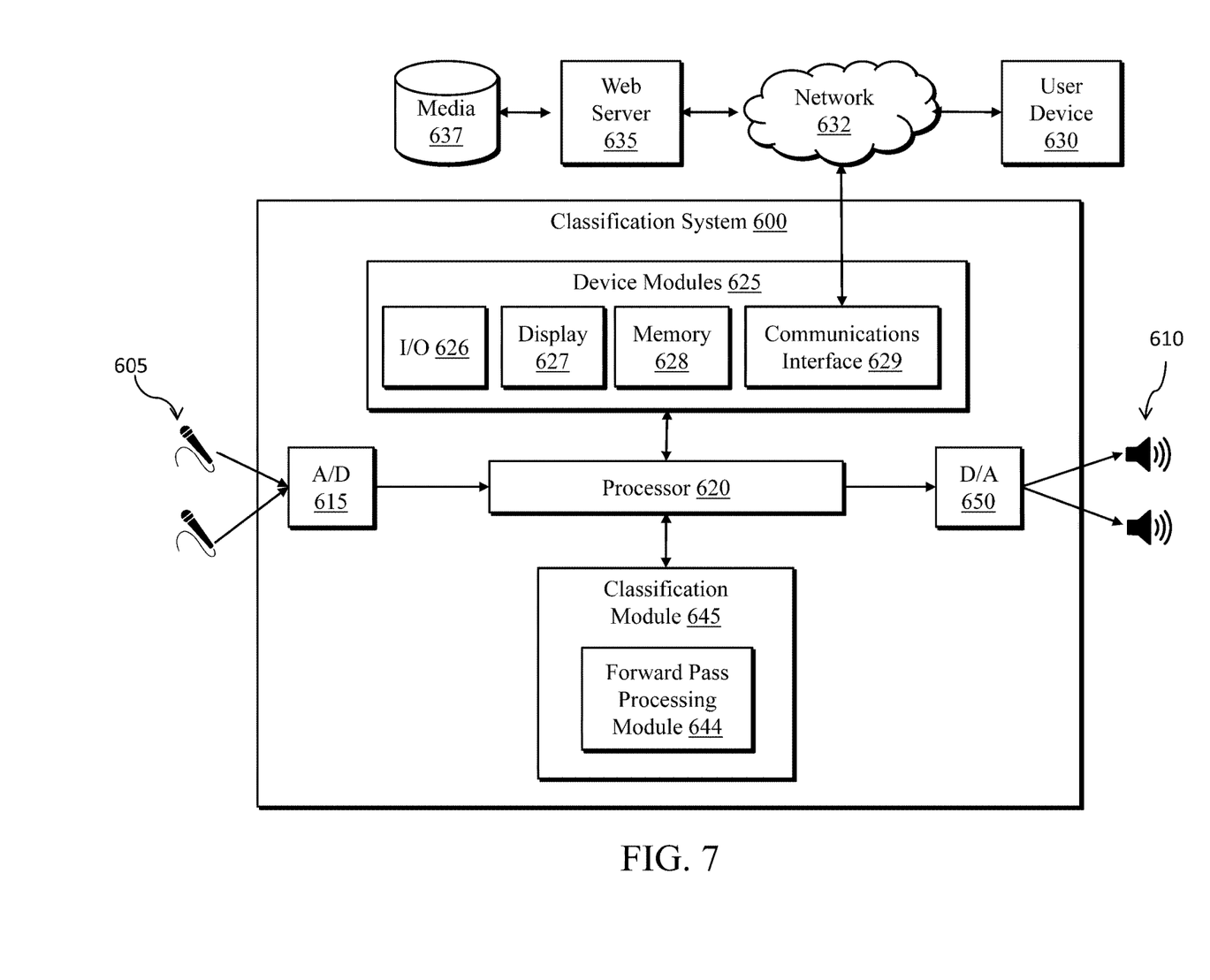
FIG. 7 is a block diagram illustrating a classification system, in accordance with an embodiment.

FIG. 7 illustrates an exemplary classification system 600 of some embodiments that performs at least part of the classification training process described above. The classification system 600 may be implemented as a mobile device, such as a smart phone or a laptop computer, a television or display monitor, a display computer, a computer server, an automobile, a speech recognition system, or any other device that provides audio keywords (e.g., commands) recognition capability. The classification system 600 is communicatively coupled with one or more audio inputting devices 605 such as a microphone and optionally also with one or more audio outputting devices 610 such as a loudspeaker.

In some embodiments, the classification system 600 can include an analog-to-digital converter 615 that converts the analog audio signals received from the audio inputting devices 605 into digital audio signals and sends the digital audio signals to processor 620, which can be a micro-controller, a digital signal processor (DSP), or other processing components, for controlling and facilitating the operations of the classification system 600, including controlling communications with internal and external devices. The classification system 600 may also include a digital-to-analog converter 650 that converts digital audio signals generated by the different modules and components of the classification system 600 to analog signals before transmitting the analog signals to the one or more audio outputting devices 610.

The classification system 600 includes one or more communication channels such as a bus for facilitating communication of data between various components of the classification system 600. Components may include device modules 625 for providing device operation and functionality, which may include input/output components 626 such as a touch screen, keyboard, mouse, etc., a display 627 such as a monitor, a memory 628 such as RAM, solid state drive, disk drive, database, etc., and a communications interface 629. In some embodiments, the communications interface 629 may include a network interface (e.g., Ethernet interface) or a wireless transceiver for enabling the classification system to communicate with remote devices over a network 632. Remote devices may include user devices 630 (e.g., household appliances, other user electronics, etc.), or a web server 635 that is communicatively coupled with a media storage 637.

The classification system 600 also includes a classification module 645 programmed to use the neural network that was trained and updated by the classification training system 500. The classification module includes the forward pass processing module 644. In one embodiment, Forward Pass Processing Module 644 is programmed to perform classification and prediction on audio input data received from audio inputting devices 605. In various embodiments, classification module 645 may include an automatic speech recognition (ASR) module providing voice command processing, an image search and classification system, an object detection system, medical diagnostic module, or other application configured for use with the neural network as described herein. The forward pass processing module 644 can generate a response based on a LSTM network in real-time or close to real-time of the audio input. In some embodiments, the classification module 645 can be programmed to output the response as an audio sound via the digital-to-analog converter 650 and the audio outputting devices 610. Instead of or in addition to producing and audio signal, the classification module 645 can be programmed to send a signal to an external device (e.g., to initiate an action or a transaction through the external device) based on the generated response. For example, the classification system 600 can be part of or communicatively coupled with a smart home system, and send a signal to a user device (e.g., a household appliance) via a network 632 (e.g., a local area network within the user's residence) based on the generated response (e.g., sending a signal to turn on the television based on the response generated by an audio input from the user). In another example, the classification system 600 can initiate a transaction with a webserver 635 over the Internet based on the generated response (e.g., sending a signal to the web server 635 to purchase a movie stored in media storage 637 based on the response generated by an audio input from the user). The classification system disclosed herein is not limited to processing audio signals, but can be used to train a neural network to process different input (e.g., image data, video data, etc.) as well.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably program the computing device to provide the roles, responsibilities, or other functionality as discussed above with respect to the disclosed apparatus. In especially preferred embodiments, the various servers, systems, databases, or interfaces exchange data using standardized protocols or algorithms, possibly based on Hypertext Transfer Protocol (HTTP), Hypertext Transfer Protocol Secure (HTTPS), Advanced Encryption Standard (AES), public-private key exchanges, web service application program interfaces (APIs), known financial transaction protocols, or other electronic information exchanging methods. Data exchanges preferably are conducted over a packet-switched network, the Internet, local area network (LAN), wide area network (WAN), virtual private network (VPN), or other type of packet switched network.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer-implemented method for training a neural network for phoneme recognition comprising:
   receiving, at a computing device, a stream of segmented, labeled training data having a sequence of frames;
   generating, by the computing device, neural network outputs for the sequence of frames in a forward pass through the training data and in accordance with weights and biases; and
   updating, by the computing device, the weights and biases through a backward pass through the training data, the backward pass comprising:
   obtaining Region of Target (ROT) information from the stream of segmented, labeled training data;
   generating a forward-backward masking based on the ROT information, the forward-backward masking placing at least one restriction on a neural network output path;
   computing modified forward and backward variables based on the neural network outputs and the forward-backward masking; and
   updating the weights and biases of the neural network.

2. The computer-implemented method of claim 1, wherein updating, by the computing device, the weights and biases through the backward pass further comprises computing a soft target using the forward-backward masking and the neural network outputs.

3. The computer-implemented method of claim 2, wherein updating, by the computing device, weights and biases through the backward pass further comprises computing a signal error based on the neural network outputs and the soft target.

4. The computer-implemented method of claim 3, further comprising identifying target and shared regions in the stream of segmented, labeled training data and wherein the soft target is computed only for identified target and shared regions.

5. The computer-implemented method of claim 1, wherein updating the weights and biases of the neural network further comprises adaptively learning to improve a convergence rate of the neural network.

6. The computer-implemented method of claim 5, wherein adaptively learning to improve a convergence rate of the neural network comprises a first algorithm based on momentum for the weights and biases of an output layer of the neural network.

7. The computer-implemented method of claim 6, wherein adaptively learning to improve a convergence rate of the neural network further comprises a second algorithm based on a Root Mean Square (RMS) of a signal error for other weights and biases.

8. The computer-implemented method of claim 1, wherein computing the forward-backward masking further comprises, computing modified forward and backward variables in a logarithm domain, thereby avoiding underflow.

9. The computer-implemented method of claim 1, wherein the neural network is a recurrent neural network.

10. A classification training system comprising:
    a neural network for use in a classification of input data;
    a training dataset providing segmented labeled training data; and
    a classification training module operable to train the neural network using the segmented labeled training data, the classification training module comprising a forward pass processing module, and a backward pass processing module;
    wherein the forward pass processing module is operable to train the neural network by generating neural network outputs for the training data using weights and bias for the neural network; and
    wherein the backward pass processing module is operable to train the neural network by updating the weights and biases in a backward pass, wherein the backward pass module is operable to:
    obtain Region of Target (ROT) information from the segmented, labeled training data;
    generate a forward-backward masking based on the ROT information, the forward-backward masking placing at least one restriction on a neural network output path;

compute modified forward and backward variables based on the neural network outputs and the forward-backward masking; and update the weights and biases of the neural network.

11. The classification training system of claim 10, wherein the backward pass processing module is further operable to update the weights and biases by computing a soft target using the forward-backward masking and the neural network outputs.

12. The classification training system of claim 11, wherein the backward pass processing module is further operable to update the weights and biases by computing a signal error based on the neural network outputs and the soft target.

13. The classification training system of claim 12, wherein the backward pass processing module is further operable to identify target and shared regions in the segmented, labeled training data and wherein the soft target is computed only for identified target and shared regions.

14. The classification training system of claim 11, wherein the backward pass processing module is further operable to update the weights and biases of the neural network by adaptively learning to improve a convergence rate of the neural network.

15. The classification training system of claim 14, wherein adaptively learning to improve a convergence rate of the neural network comprises a first algorithm based on momentum for the weights and biases of an output layer of the neural network.

16. The classification training system of claim 15, wherein adaptively learning to improve a convergence rate of the neural network further comprises a second algorithm based on a Root Mean Square (RMS) of a signal error for other weights and biases.

17. The classification training system of claim 11, wherein the backward pass processing module is further operable to compute the forward-backward masking by computing modified forward and backward variables in a logarithm domain, thereby avoiding underflow.

18. The classification training system of claim 11, wherein the neural network is a recurrent neural network.

19. The classification training system of claim 11, wherein the neural network is a long short-term memory network.

20. The classification training system of claim 11, wherein the classification training system is a phoneme recognition system, and wherein the backward pass processing module is further operable to update the weights and biases by computing a signal error for output nodes of the neural network, thereby allowing the phoneme recognition system to operate without latency.

\* \* \* \* \*